(12) United States Patent
Battersby et al.

(10) Patent No.: US 9,614,748 B1
(45) Date of Patent: Apr. 4, 2017

(54) MULTITENANT DATA CENTER PROVIDING VIRTUAL COMPUTING SERVICES (75) Inventors: Clinton Battersby, Norwood, MA (US); Maria V. Battersby, legal representative, Norwood, MA (US); Kenneth Ringdahl, Pelham, NH (US); James Snow, Alameda, CA (US); Andrew Hobgood, Grantham, NH (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 13/191,037

(22) Filed: Jul. 26, 2011
(Under 37 CFR 1.47)

Related U.S. Application Data (63) Continuation of application No. 12/424,247, filed on Apr. 15, 2009, now Pat. No. 8,281,377.

(60) Provisional application No. 61/045,025, filed on Apr. 15, 2008.

(51) Int. Cl.
*G06F 15/173* (2006.01)
*H04L 12/751* (2013.01)
*G06F 9/50* (2006.01)
*H04L 29/06* (2006.01)
*H04L 12/46* (2006.01)
*H04L 12/911* (2013.01)
*H04L 12/931* (2013.01)
*H04L 12/723* (2013.01)

(52) U.S. Cl.
CPC ........... *H04L 45/02* (2013.01); *G06F 9/5061* (2013.01); *H04L 12/4654* (2013.01); *H04L 45/50* (2013.01); *H04L 47/70* (2013.01); *H04L 49/70* (2013.01); *H04L 63/0272* (2013.01); *H04L 63/0815* (2013.01); *H04L 63/10* (2013.01)

(58) Field of Classification Search
CPC ... G06F 9/5061; H04L 63/0815; H04L 63/10; H04L 47/70; H04L 49/70; H04L 12/4654; H04L 45/50; H04L 63/0272; H04L 61/2514; H04L 61/2589; H04L 61/2575; H04L 61/2567; H04L 63/029; H04L 67/28; H04L 12/4641
USPC ........................................................ 709/242
See application file for complete search history.

(56) References Cited

U.S. PATENT DOCUMENTS 6,175,867 B1 * 1/2001 Taghadoss .................... 709/223
6,536,043 B1 3/2003 Guedalia
(Continued)

FOREIGN PATENT DOCUMENTS

| EP | 1259084 A1 * | 11/2002 |
|---|---|---|
| EP | 2 357 763 | 8/2011 |
| WO | 2013134439 A2 | 9/2013 |

OTHER PUBLICATIONS

Office Action in U.S. Appl. No. 12/424,247 mailed Apr. 17, 2012.
(Continued)

*Primary Examiner* — Glenton B Burgess
*Assistant Examiner* — Miran Moorad (57) ABSTRACT

A service provider network supports multiple tenants by having a virtual local area network for each enterprise, and a router connected to enterprise networks of the multiple tenants including a virtual router for each enterprise. The virtual router has a distinct routing table for each enterprise, for routing traffic between the desktops hosted on the plurality of host machines and the computer resources on the enterprise networks.

17 Claims, 10 Drawing Sheets

(56) References Cited

U.S. PATENT DOCUMENTS

| | | | |
|---|---|---|---|
| 6,615,357 B1* | 9/2003 | Boden | H04L 29/12481 709/238 |
| 7,516,255 B1 | 4/2009 | Hobbs | |
| 7,590,750 B2 | 9/2009 | Adbo | |
| 7,802,000 B1* | 9/2010 | Huang | G06F 9/5077 455/404.2 |
| 7,948,922 B2 | 5/2011 | Pang | |
| 8,014,308 B2* | 9/2011 | Gates et al. | 370/252 |
| 8,170,123 B1 | 5/2012 | Hobgood | |
| 8,281,377 B1 | 10/2012 | Snow | |
| 8,307,362 B1 | 11/2012 | Gong | |
| 8,725,886 B1 | 5/2014 | Pulier et al. | |
| 8,959,338 B2 | 2/2015 | Snow et al. | |
| 2002/0069369 A1* | 6/2002 | Tremain | H04L 63/0209 726/14 |
| 2003/0115344 A1* | 6/2003 | Tang | H04L 63/0272 709/229 |
| 2003/0135578 A1* | 7/2003 | Banga et al. | 709/215 |
| 2006/0002315 A1 | 1/2006 | Theurer | |
| 2006/0031225 A1* | 2/2006 | Palmeri et al. | 707/10 |
| 2006/0090136 A1* | 4/2006 | Miller et al. | 715/734 |
| 2006/0203007 A1 | 9/2006 | Bullard et al. | |
| 2007/0097130 A1 | 5/2007 | Margulis | |
| 2007/0162945 A1 | 7/2007 | Mills | |
| 2007/0162968 A1* | 7/2007 | Ferreira | H04L 29/12481 726/12 |
| 2007/0220168 A1 | 9/2007 | Parsons | |
| 2007/0226762 A1 | 9/2007 | Girgis | |
| 2008/0013916 A1 | 1/2008 | Sharpe | |
| 2008/0043764 A1* | 2/2008 | Ishizaki | H04L 41/0816 370/401 |
| 2008/0080396 A1* | 4/2008 | Meijer et al. | 370/254 |
| 2008/0080552 A1 | 4/2008 | Gates et al. | |
| 2008/0170622 A1 | 7/2008 | Gordon | |
| 2008/0240122 A1* | 10/2008 | Richardson et al. | 370/401 |
| 2008/0267187 A1* | 10/2008 | Kulmala et al. | 370/392 |
| 2008/0301566 A1 | 12/2008 | Abdo | |
| 2008/0313278 A1 | 12/2008 | Hochberg | |
| 2009/0106405 A1* | 4/2009 | Mazarick | H04L 63/0236 709/222 |
| 2009/0144393 A1 | 6/2009 | Kudo | |
| 2009/0177996 A1 | 7/2009 | Hunt | |
| 2009/0178006 A1 | 7/2009 | Lemay | |
| 2009/0248869 A1* | 10/2009 | Ghostine | 709/225 |
| 2010/0037310 A1 | 2/2010 | Turley | |
| 2011/0090911 A1 | 4/2011 | Hao | |
| 2011/0119390 A1 | 5/2011 | Leech | |
| 2011/0142053 A1 | 6/2011 | Van Der Merwe | |
| 2012/0213294 A1 | 8/2012 | Hobgood et al. | |
| 2013/0174242 A1 | 7/2013 | Snow | |
| 2013/0235874 A1 | 9/2013 | Ringdahl et al. | |

OTHER PUBLICATIONS

Office Action in U.S. Appl. No. 12/424,314 mailed Aug. 4, 2011.
Office Action in U.S. Appl. No. 13/632,202 mailed Aug. 2, 2013.
Search report in PCT patent application PCT/US2013/029462 mailed Oct. 16, 2013.
Notice of Allowance in U.S. Appl. No. 13/632,202, mailed Jul. 10, 2014.
First office action in U.S. Appl. No. 13/461,380, mailed Jun. 30, 2014.
"MPLS VPN—VRF Selection Based on Source IP Address". 18 pages, Cisco IOS Release 12.0(22)S, dated 2007.
U.S. Appl. No. 13/974,774, filed Aug. 23, 2013, Unpublished.
"MPLS/BGP Virtual Private Networks", 13 pages, copyright 2002, Spirent plc.
"Virtual Routing", Version 1.21-r5, copyright 2005, Interpeak AB.
Final office action in U.S. Appl. No. 13/461,380, mailed Nov. 5, 2014.
First Office Action in U.S. Appl. No. 13/413,867, mailed Apr. 8, 2015.
Interpeak Secure Networking Software, "Virtual Routing" Bringing TCP/IP to a New Level, 2005.
Office Action in U.S. Appl. No. 13/461,380, mailed Jun. 18, 2015.
Office Action in U.S. Appl. No. 13/974,774, mailed Jul. 16, 2015.
Office Action in U.S. Appl. No. 13/461,380, mailed Jul. 2, 2014.

* cited by examiner

Access Switch and Storage Network Configuration

FIG. 11

MULTITENANT DATA CENTER PROVIDING VIRTUAL COMPUTING SERVICES

RELATED APPLICATIONS

This application is a continuation of, and claims priority to and the benefits under 35 U.S.C. 120 of, U.S. patent application Ser. No. 12/424,247, filed Apr. 15, 2009, now pending, and which is hereby incorporated by reference, which is a nonprovisional application claiming priority to and the benefits under 35 U.S.C. 119 of U.S. Provisional Patent Application 61/045,025, filed Apr. 15, 2008.

This Patent Application claims priority to and the benefits under 35 U.S.C. §119(e) of U.S. Provisional Patent Application No. 61/045,025, filed Apr. 15, 2008, which is incorporated herein by reference, and of which a portion is reproduced in Appendix A attached hereto, which is incorporated herein by reference.

BACKGROUND

Modern enterprises expend substantial capital to maintain an IT infrastructure. A significant percentage of the expenditure stems from equipping individual users with dedicated computing resources in the form of desktop computers. There is a nearly universal mandate in corporations, governments and academic institutions to better control the escalating costs and complexity of managing desktops in large numbers and across widely disparate geographies. In addition, most companies continue to deploy traditional physical desktop computers running at less than 10% capacity, resulting in enormous waste of time, money and energy. In the computer realm, there is a continuing shift from initial deployment costs to ongoing maintenance costs. Traditionally, a computing infrastructure was marked with substantial up-front costs due to the high cost of computing hardware and memory resources. However, with the ongoing trend of reduced costs for computing hardware, and the converse trend of increased compensation for skilled personnel to support and maintain computer systems, a typical enterprise spends more to maintain a user then the cost to initially outfit the user.

Consistent with this view of reducing IT infrastructure costs, a provisioning approach that selectively provides users with only the computer services they need for a predetermined interval is more cost effective than outfitting each user with a largely idle PC. Early computing environments implemented a "mainframe" computing approach that allowed user access to the mainframe from a terminal device that performed only input and output. A multiprogramming operating system on the mainframe performed rapid context switching between a multitude of users to give each user the impression that the mainframe computer was dedicated to that user. Each user shared the memory, disk storage, and CPU capabilities for usage of the installed applications, giving each user a similar user experience. The mainframe was generally accessed from local terminals via a so-called "front end", or via telecommunications lines that were specific to a facility or dedicated POTS (plain old telephone service) voice lines, thus consuming expensive dedicated lines (i.e. not packet switched) for each remote user.

The modern equivalent of this paradigm is often referred to as Virtual Desktop computing as opposed to the more conventional deployment of PCs that have CPU, memory and storage and execute all of the software locally. Virtual Desktops are hosted on central servers that share the memory and CPU with multiple virtual desktop sessions. Users connect to these Virtual Desktops over the network using thin clients that are used to provide the keyboard and display for the virtual desktop session. Identification of each individual virtual desktop and thin client typically requires a specific network identifier such as an IP address on the local network.

Technologies such as virtual private network (VPN) arrangements are often employed to provide connectivity between virtual desktops on the LAN (local area network) and remote devices accessing the virtual desktops over the public internet. A VPN addresses security and also solves the problem of the private LAN address used for the virtual desktops by extending the local network to the remote user. A common vehicle for performing translation between local and global IP addresses is Network Address Translation techniques. Network Address Translation (NAT) is introduced in RFC 3022 promulgated by the IETF, promulgated by the IETF (Internet Engineering Task Force), as is known in the art, and specifies a format for translating local IP addresses to global IP addresses, however, it lacks the security and session management necessary for virtual desktops.

SUMMARY

In a virtual computing environment such as that described in copending U.S. patent application Ser. No. 11/875,297, filed Oct. 19, 2007, entitled "PROVISIONED VIRTUAL COMPUTING", incorporated herein by reference, users receive computing services through a local computing device coupled via a network connection to a computing services provider. The local computing device may be a thin client having minimal computational resources, in order to reduce deployment cost while shifting the computing load to the computing services provider. By equipping the thin client with only the required display, communication and user I/O capabilities, many thin clients are deployable for network connection to a server providing the requested computing services.

Virtual computing environments facilitate user provisioning by deploying a minimal set of computing hardware to each user and structuring computing services from a server to each user according to a best fit model that neither over provisions nor under provisions each user. The minimal hardware deployment effected by the local thin client device (local device) employs a network connection to the computing services provider, typically a server and associated equipment for providing computing services, as described in the copending application cited above. The local device generally performs I/O and display operations while deferring computing operations to the server, thus relying on the network connection.

Typically, the network connection between the local display device and the virtual computing services server (server) is provided by a TCP/IP connection over a LAN or local area network that often employ private or un-routable IP addresses. While this works well for virtual desktops and display devices located on the LAN, it presents significant challenges for remote users and devices that are not on the local LAN.

Technologies such as virtual private network (VPN) arrangements are employed to provide connectivity between the virtual computing services having local addresses on the LAN and Internet destinations having global addresses.

A common vehicle for performing translation between local and global IP addresses is Network Address Translation techniques. As indicated above, Network Address Translation (NAT) is introduced in RFC 3022, and specifies a format for translating local IP addresses to global IP addresses. Conventional arrangements using VPN, NAT and other subnetwork arrangements, however, suffer from the shortcoming that VPNs require substantial network administration efforts to configure various locations, thus increasing overhead, and NAT based addresses nonetheless publish as valid IP routing addresses, therefore providing stationary targets for hackers. Further, in a large organization, many local IP addresses need be configured by such VPN and NAT schemes.

Accordingly, configurations here substantially overcome the shortcomings of conventional NAT allocation and VPNs for connecting remote users to local virtual computing by referencing the local computing resource using a public address and a port identifier indicative of the user and corresponding local computing resource. The port identifier is randomly generated within a prescribed range and is used to begin a new session for each virtual computing resource.

The combination, or tuple, of an IP address/port is allocated to a local compute resource and thus, to a particular user, for the duration of establishing the session using a remote protocol such as a Remote Desktop Protocol (RDP). A NAT based rule is initially used for mapping local addresses, or identifiers, to global addresses (global identifiers) to establish a TCP/IP session. Once the TCP/IP session is established, an entry is made in a firewall state table and the NAT routing rule is removed so no new connections to the local compute resource are accepted. Successive users receive a different port number according to the then existing rule, and the predetermined duration of the rule (such as 30 seconds) assures that port numbers are continually changing, relieving the security risk of a static port mapping.

Conventional arrangements, therefore, employ a rule or set of rules in a static manner, such that the rules are indicative of a static mapping. In contrast, configurations herein employ the rules in a dynamic manner such that a pool of ports is available for allocation to a plurality of users (user devices), and, once allocated, the rule is revised to specify a different port for each subsequent user to establish a session to a local compute resource. Once the session has been established, an entry is made in a firewall state table and the NAT rule is removed and the port returned to a pool of available ports for connecting more sessions. In the example configuration shown, the mapping is integrated with a firewall state table such that the firewall state table allows the session to continue uninterrupted after the NAT connection rule is removed. Subsequent connection requests using the same port and a new NAT rule do not interfere with the current session that is already in the state table of the firewall.

In this manner, the external port number and NAT routing rule is only used briefly to establish the session and place an entry in the firewall routing such that remote IP addresses transport message traffic to the local device via the IP address/port mapping, discussed further below.

In a multi-tenant data center, creating virtual routers for each enterprise, we are able to maintain distinct routing tables for each tenant, and resolve the addressing conflict. This can be implemented using virtual routing and forward (VRF) in MPLS, which enables virtualizing the router.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Address mapping schemes to effectively service a multitude of local nodes on a LAN from a single global address help mitigate the problem of IP address exhaustion. In a managed information environment suitable for use with configurations discussed herein, a server provides virtual computing services to a user community as described in the copending application cited above. Particular configurations employ RDP as a remoting protocol over a TCP/IP session between display devices and the virtual compute resource.

An example mechanism for establishing a session from a remote device to a virtual compute resource includes a NAT routing rule persisting for a predetermined duration until the session is established. Configurations herein periodically modify NAT routing rules that listen for new connection requests. Upon attempting to establish a connection to the server, a local compute resource is temporarily associated with a port number specified by the rule. While the NAT routing rule initially uses this port number for new connection requests, once the session is established, the NAT routing rule is replaced by an entry in a firewall state table and the port number is no longer associated with the session and can be re-used to establish additional sessions.

In an example configuration, disclosed further below, a NAT arrangement employs a port number for identifying an individual user and corresponding virtual computing session. The example configuration performs set up and tear down of NAT rules for effectively allocating a port number to a particular user for a duration sufficient to establish a connection. An alternative mapping, such as that maintained in a firewall state table, persists for maintaining the connection. In conventional NAT, in contrast, the mapping is typically static for the duration of the connection.

When a user authenticates, configurations herein create a NAT rule for that user, which is only valid for a short period of time (30 seconds) after which the NAT rule is removed. The user must connect using the NAT rule—which puts his session into the firewall's state table—before the NAT rule is removed. The NAT rule uses a dynamic range of ports, with random selection of port numbers. This means that access to a particular virtual compute session RDP port is open only for 30 seconds at a time, on a random port on a public IP address. Further, Windows logon credentials must still be presented in order to logon to the virtual compute session enhancing security.

This effectively prevents an attacker from continuously scanning or polling known RDP ports, as well as restricting the virtual machine (i.e. computing services session instantiated on the server) to which a user with valid credentials can access. Even an authenticated user can only login to the specific virtual machines they are authorized to access.

Figure 1:
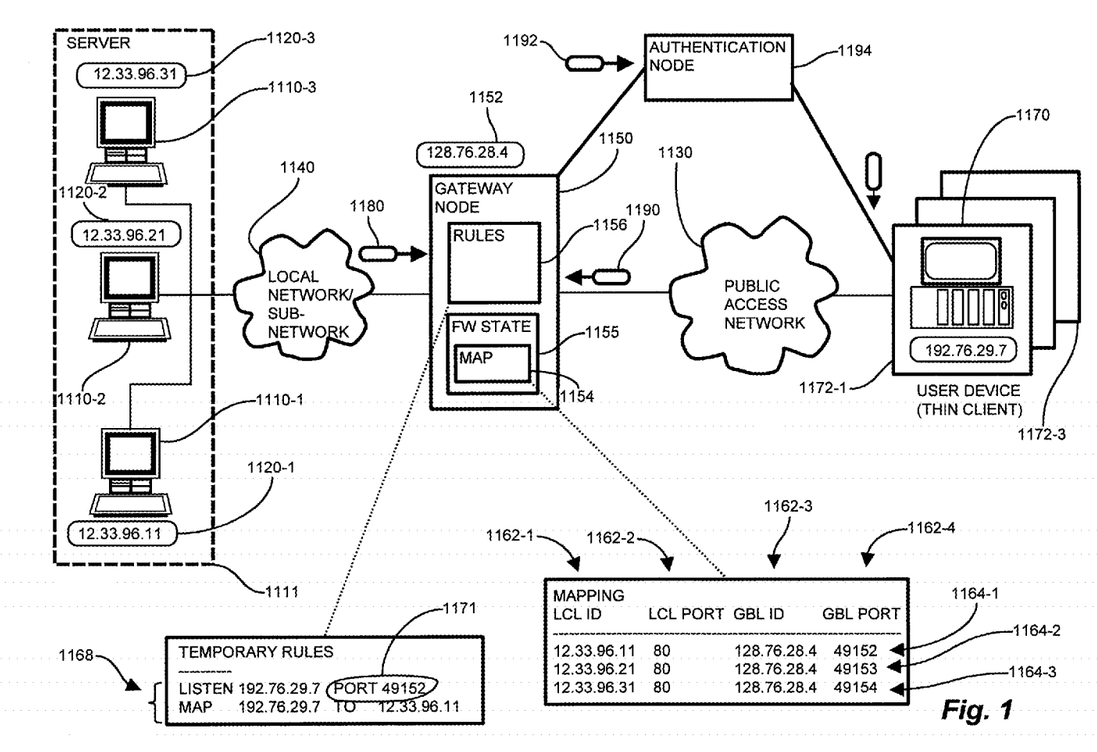
FIG. 1 is a context diagram of an exemplary computing environment suitable for use with the access management framework disclosed herein.
Figure 2:
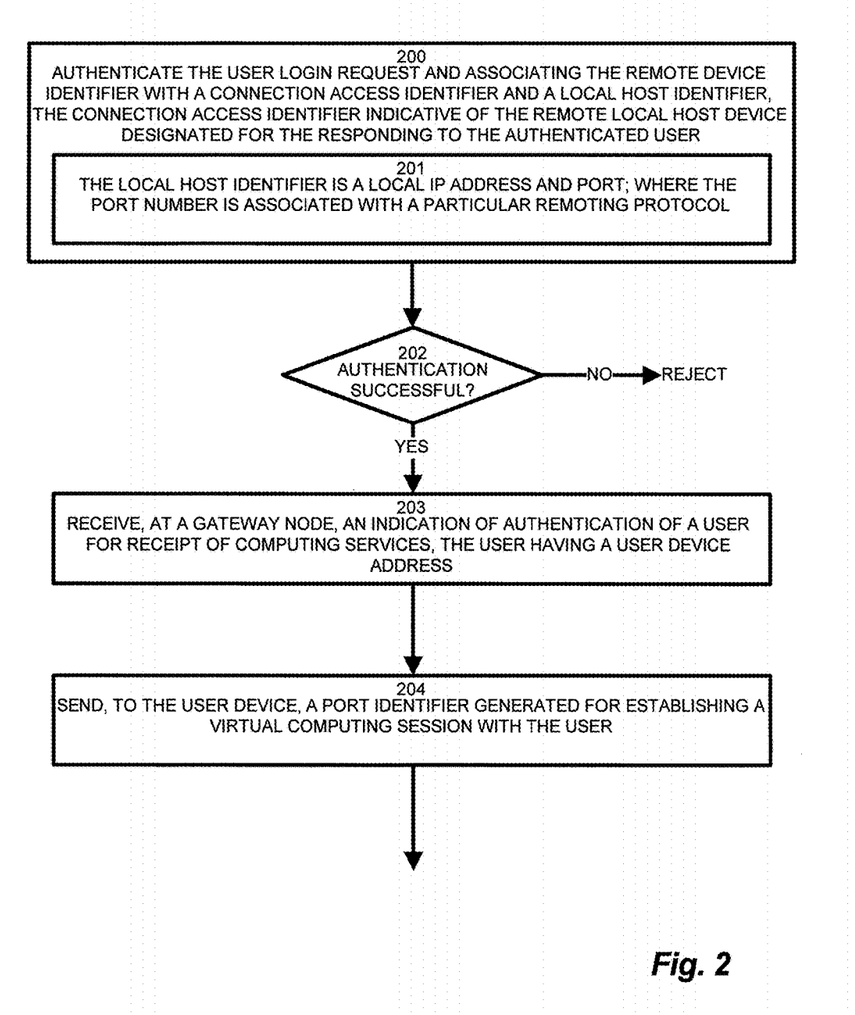
FIGS. 2-5 are a flowchart of connection mapping in the computing environment of FIG. 1.
Figure 3:
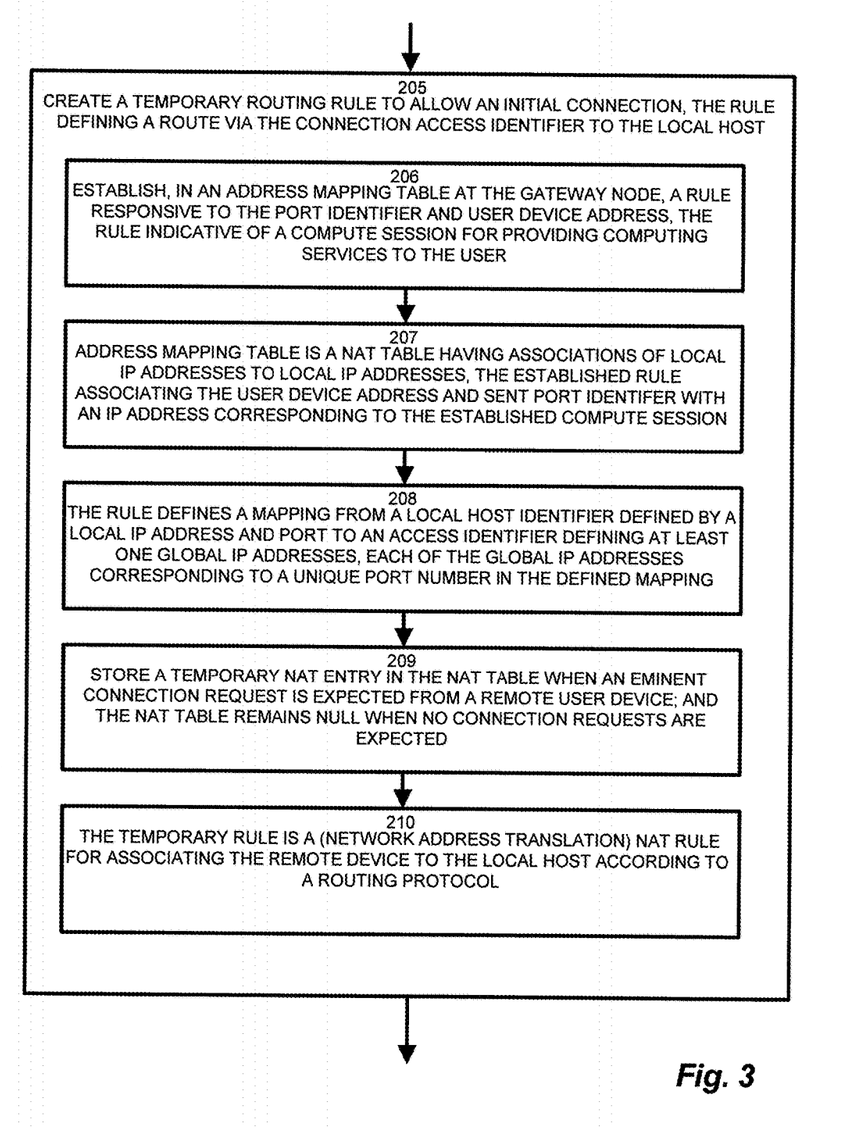
Figure 4:
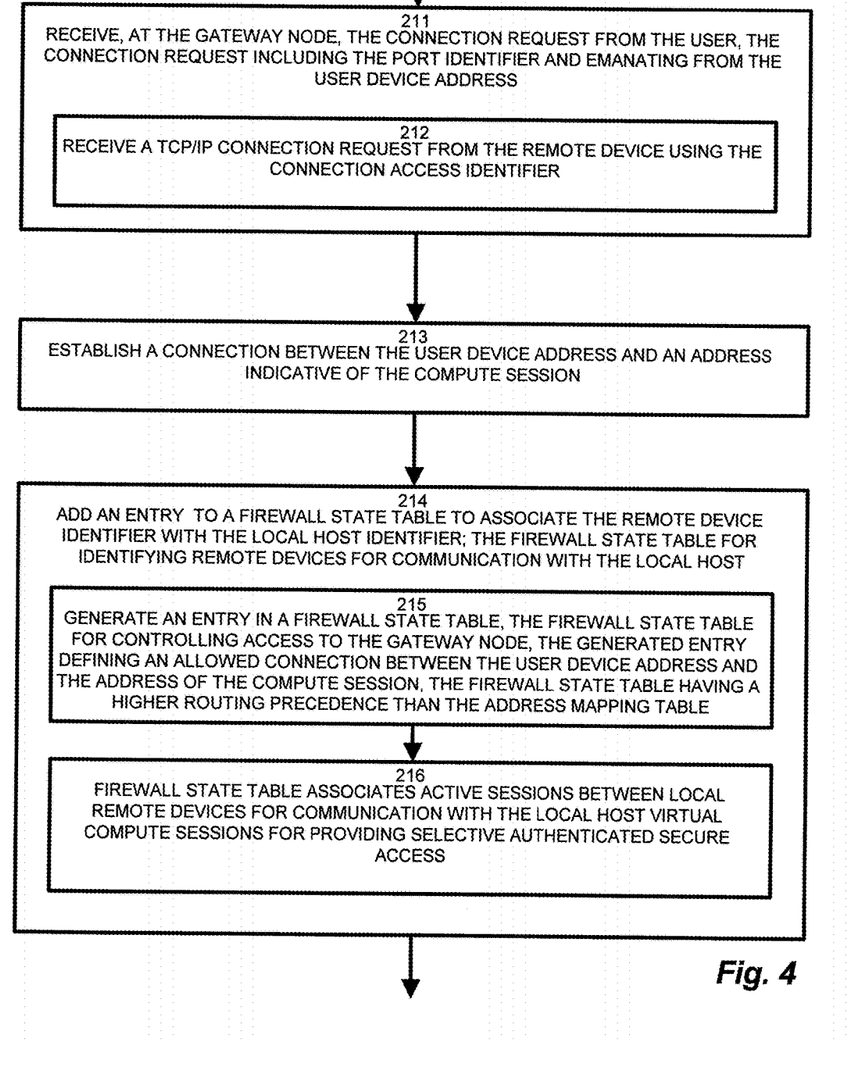
Figure 5:
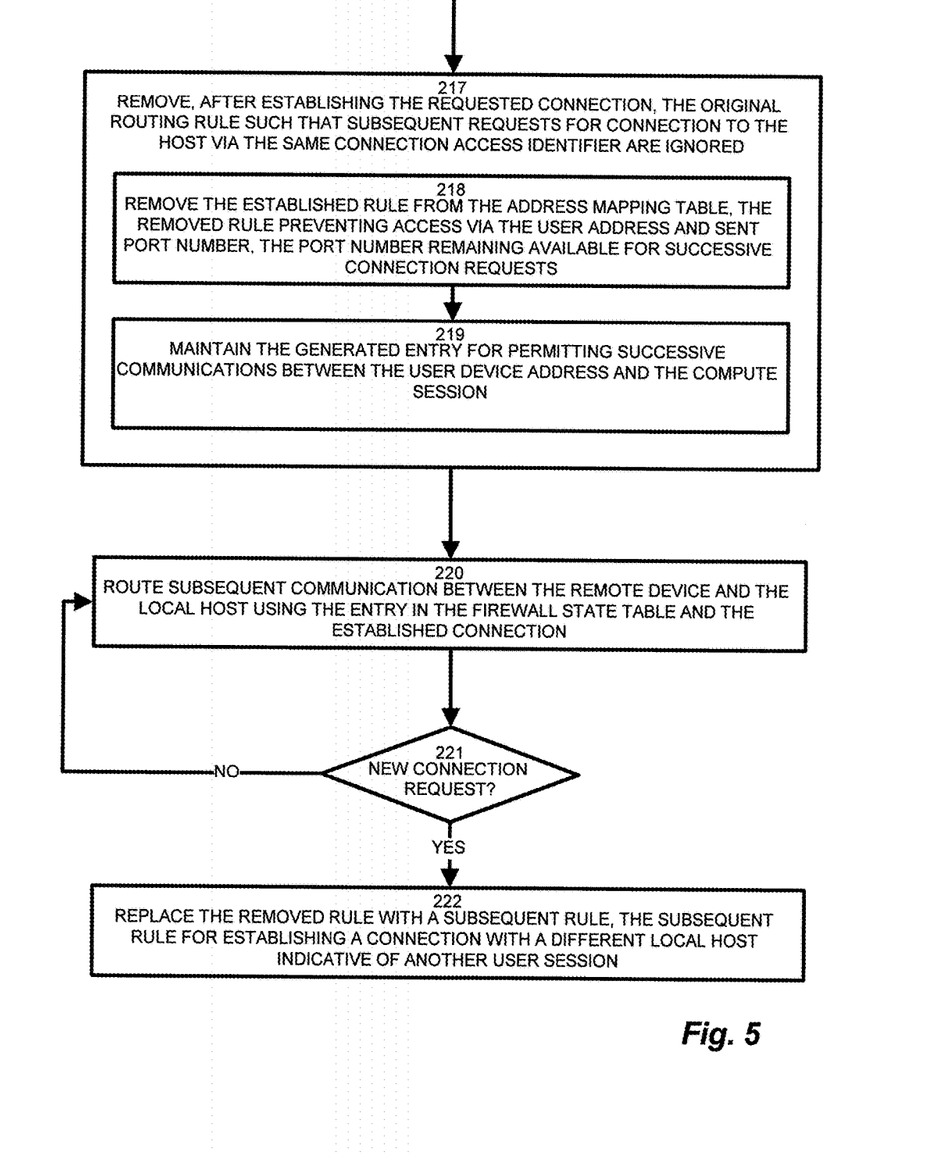
Figure 6:
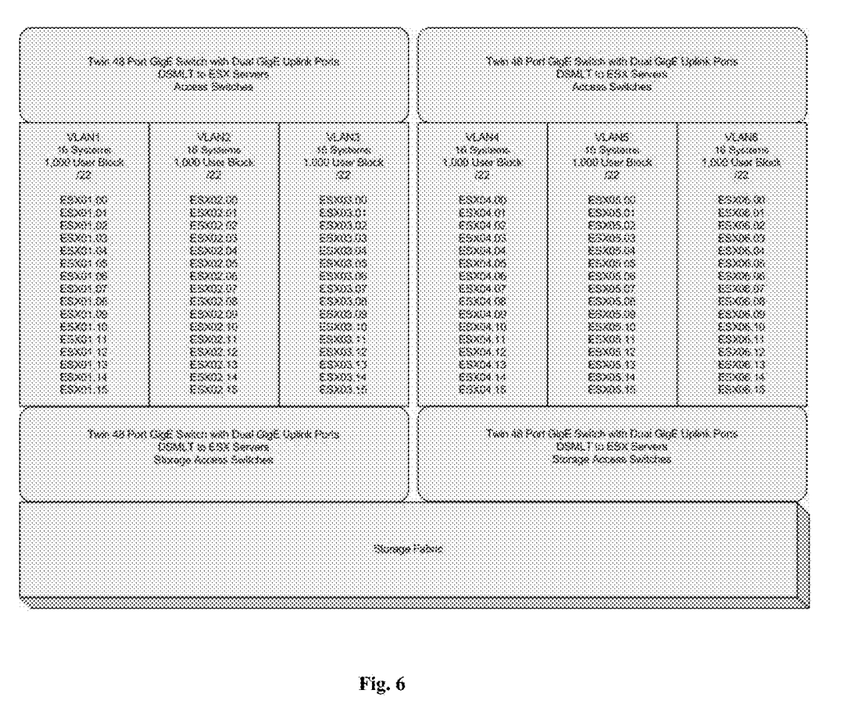
FIGS. 6-11 are reproductions from the provisional application.
Figure 7:
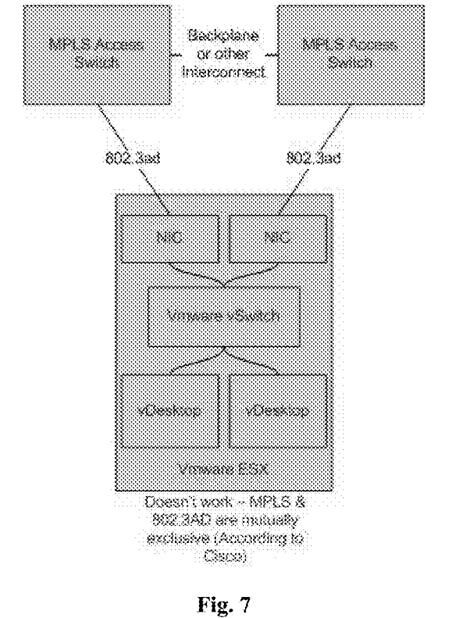
Figure 8:
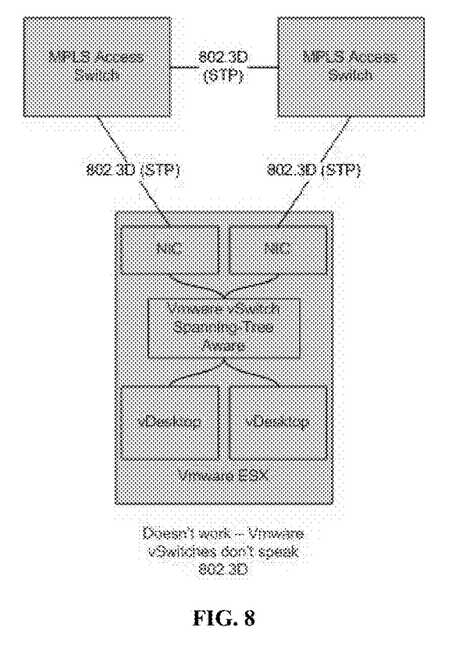
Figure 9:
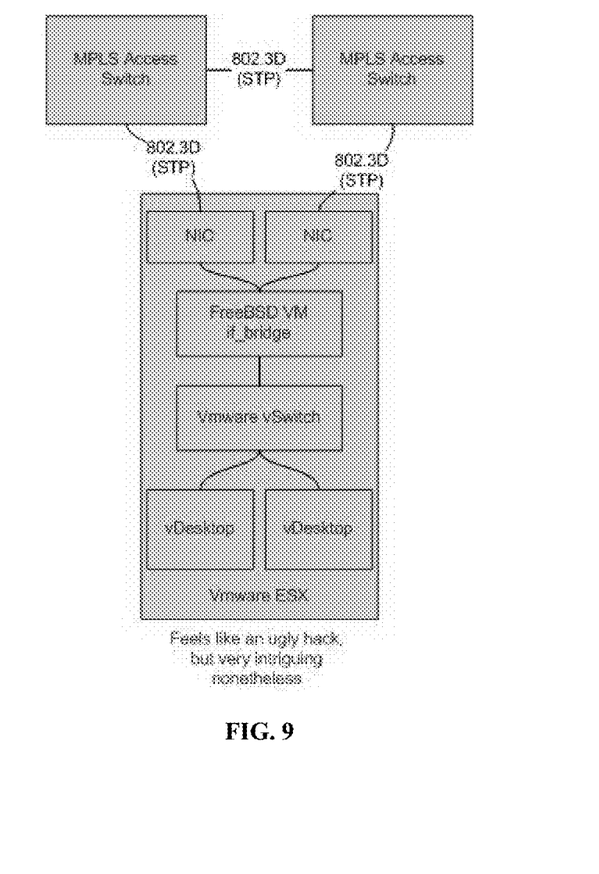
Figure 10:
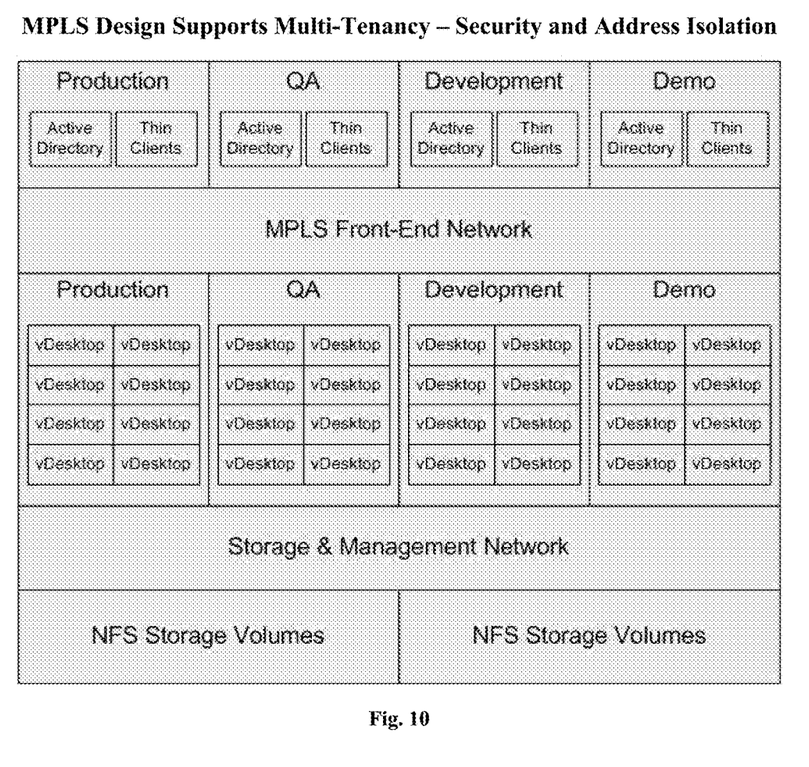
Figure 11:
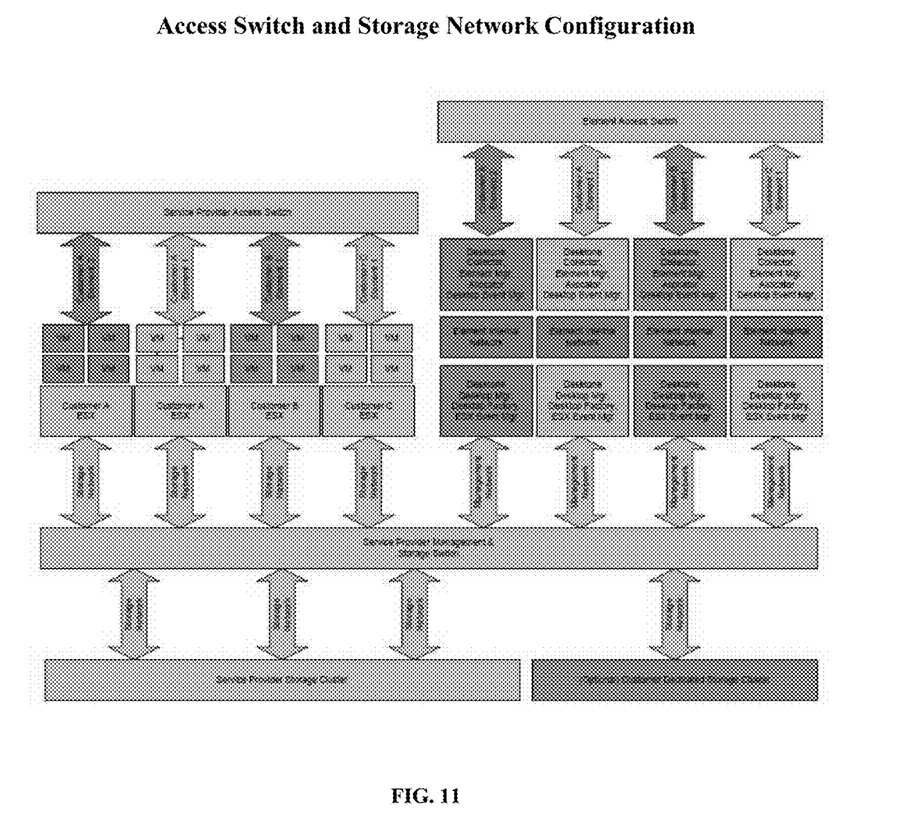

In one respect, such an approach is effectively proxying the RDP TCP/IP session, however, by limiting involvement to network stack layers 3 and 4, and by using standards and tools such as NAT, pfsync and CARP, as is known in the art, this approach overcomes the limits of a normal session proxy and attain fault tolerance. Failure of one node in a high availability configuration will not disrupt any of the TCP/IP sessions passing through it. Although the examples cited are using RDP, the same technique can be used for any remoting protocol running over a TCP/IP session. An example arrangement is shown in FIG. 1, which illustrates establishing the mapping via a temporary rule, then tearing down the rule while allowing the established connection to persist using the defined IP identifiers, in this case, an IP address and port number established via NAT. The example arrangement shown includes a virtual computing server 1110 supporting a number of virtual compute sessions 1110, each having a local address 1120 unique within the subnetwork 1140. The virtual compute sessions 1110 are local hosts for the user session they support, and may be implemented on a single machine, on a plurality of coupled processors, in a distributed arrangement arranged as a computing grid, or a combination of these arrangements, discussed in the copending application cited above. Each of the virtual compute sessions 1110 supports a user at a user device, such as a thin client device 1180, generally operable for user interfacing operation (i.e. input, output, graphical rendering), deferring the actual computing operations to a corresponding virtual compute sessions 1110. Referring to FIG. 1, a plurality of local virtual desktop resources 1110-1 . . . 1110-3 (1110 generally) connect to a public access network 1130 such as the Internet via a local network 1140, coupled to the public access network 1130 via a gateway node 1150. Each of the plurality of virtual desktop resources 1110-1 . . . 1110-3 (1110 generally) employs a local address 1120-1 . . . 1120-3 respectively, that is unique within the local network 1140. Since there is a substantial demand for unique addresses in the public access network 1130, enterprises such as corporations, ISP subscriber groups and other sets of users often employ a local network 1140, or subnetwork. Address management between the unique subset of addresses 1120-1 . . . 1120-2 (1120, generally) are managed by a translation mechanism such as that disclosed in IETF RFC 3022: Traditional IP Network Address Translator (Traditional NAT), as is known in the art. Such address mapping mechanisms are often employed in implementations including Virtual Private Networks (VPNs), Dynamic Host Configuration Protocol (DHCP), and others.

The gateway node 1150 is a focal point of message traffic between the subnetwork 1140 and the public access network 1130. The gateway node 1150 has a global address 1152 unique in the public access network 1130, and employs the global address 1152 on behalf of each of the virtual desktop resources 1110 in the sub-network 1140. Accordingly, the gateway node 1150 has facilities for mapping 1154 local addresses 1120 to global addresses 1160 valid throughout the public access network 1130. Further, the gateway node 1150 includes a firewall state table 1155 for implementing a firewall, as is known in the art, of which the mapping 1154 controls the flow of traffic. A set of rules 1156 includes logic for initially establishing sessions and mapping 1154 of local addresses 1120 to the global address 1152. In the example configuration, the rules 1156 may be a NAT arrangement having a mapping from the user device 1170 and a predetermined port 1162-4 specifically designated for supporting the incoming connection request The map 1154 includes a plurality of fields 1162-1 . . . 1162-4 (1164, generally) for mapping, or translating, message traffic between the public access network 1130 and subnetwork 1140. The fields 1162 include a local ID 1162-1, such as a local IP address, a local port 1162-2, a global ID, or global IP address 1162-3 and global port 1162-4. The local port 1162-2 and global port 1162-4, are employable to supplement or augment the identification of the local resource 1110 and global node, defined further in IETF RFC 1700, Assigned Numbers. While some port values are reserved, others are available to clarify or augment the type of data or recipient of message traffic.

A rule 1168 specifies the mapping of a received communication, typically a set of message packets 1180, from a global node 1170, to the local resource 1110. In particular, the rules may specify a particular port on which to listen for message traffic 1180. In the configurations herein, particular ports 1162-2 are selected for inclusion in a rule that persists for a predetermined interval. Upon receipt of an incoming connection request 1190 from 1170, the listened for port 1162-2 specified by the current rule becomes mapped to the local address 1120-1 of the local resource 1110. The firewall state map table 1154, stores the local address 1120-1 (example value 12.33.96.11) 1162-1 with the port 1162-2 from the rule 1168 to the global address (ID) 1162-3 of the gateway 1150.

In further detail, the method for associating a user to local virtual desktop resources to establish a network connection includes receiving a user login request from a remote device 1170 identified by a public IP address and port 1172-1, and associating the authenticated user with a local virtual resource 1110 reserved for the authenticated user and a temporary NAT rule 1156 for establishing a connection between the remote device 1170 and the local virtual resource 1110.

The gateway node 1150 has a global IP address 1152 that is effectively "shared" by each user virtual compute resource 1110 in the local network 1140. An example routing configuration using the gateway node 1150 is shown; alternate configurations may employ alternate configurations for mapping each of the connection access identifier 1162-2 corresponding to the local resources 1110 over a public IP connection to remote devices 1170.

The NAT implementation, typically on the gateway node 1150, creates a temporary rule 1168 to allow an initial connection, such that the rule 1168 defines a route via the connection access identifier 1162-2 to the gateway node, for an ultimate connection to the local host 1110. The gateway node 1150 then receives a connection request 1190 from the remote device 1170 using the connection access identifier 1171 specified in the rules 1168. The connection access identifier 1171 results from an authentication exchange between a virtual session authorization node 1194, which designates a next available port number 1192 to accompany the global address 1172-1 corresponding to the requesting user. The port number 1192 is written as a connection access identifier 1171 in the temporary rule for receiving the connection request 1190.

Following matching of the connection request 1190 (including the global address 1172-1 and connection access identifier 1171) to the temporary rule 1168, and 1168, the gateway node 1150 adds a mapping entry 1164-1 to a firewall state table 1155 to associate the remote device identifier with the local host identifier 1162-2, in which the firewall state table 1155 is for identifying remote devices 1170 for communication with the local resource. 1110. The temporary NAT map rule 1168 rule is then removed, after establishing the requested connection, the rule such that subsequent requests for connection to the local host 1110 via the same connection access identifier are ignored or responsive to an updated rule specifying another connection access identifier 1171. Since the firewall state table 1155 takes routing precedence to the NAT mapping defined by the rules 1156, the rules 1170-1, 1170-2 are not needed once the firewall state table 1155 establishes the mapping of the local ID 1162-1 and local port 1162-2 to the global ID 1162-3 (IP address) and global port 1162-4 defined by the connection access identifier 1171. The gateway node 1150 thus routes subsequent communication between the remote device 1170 and the local resource 1110 using the entry in the firewall state table until the session is terminates.

FIGS. 2-5 are a flowchart of connection mapping in the computing environment of FIG. 1. Referring to FIGS. 2-5, the method of network port reuse for establishing network connections between local hosts and remote user devices in a virtual computing environment as disclosed herein includes, at step 200, receiving a user login request from a remote device identified by a remote device identifier, and authenticating the user login request and associating the remote device identifier with a connection access identifier and a local host identifier, such that the connection access identifier indicative of the remote local host device designated for the responding to the authenticated user. In the example shown, the local host identifier is a local IP address and port, such that the port number is associated with a particular remoting protocol, as shown at step 201. The local host 1110 provides the computing services to the user, and may be part of a larger server 1111.

A check is performed, at step 202, to determine if the authentication is successful, and the gateway node rejects invalid attempts. A valid authentication results in receiving, at a gateway node, an indication of authentication of a user for receipt of computing services, the user having a user device address, as depicted at step 203. The virtual session authorization node 1194 sends, to the user device, a port identifier generated for establishing a virtual computing session with the user, as shown at step 204. The port identifier 1192 is a connection access identifier predetermined by the virtual session authorization node 1194 for enabling a temporary rule targeted at the connecting user. The gateway node creates a temporary routing rule 1168 to allow an initial connection, such that the rule defines a route via the connection access identifier 1192 to the local host 1110, as shown at step 205. This includes, at step 206, establishing, in an address mapping table 1156 at the gateway node 1150, a rule 1168 responsive to the port identifier 1171 and user device address 1172-1, in which the rule is indicative of a compute session for providing computing services to the user.

In the example arrangement, the address mapping table 1156 is a NAT table having associations of local IP addresses to local IP addresses, and the established rule associates the user device address 1172-1 and sent port identifier 1171 with an IP address 1120-1 corresponding to the established compute session 1110-1, as described at step 207. The established temporary rule 1168 defines a mapping from a local host identifier defined by a local IP address 1120-1 and port 1171 to an access identifier defining at least one global IP address, in which each of the global IP addresses 1172-1 corresponds to a unique port number 1171 in the defined mapping, as shown at step 208, so that the expected connection emanates from the expected user specifying the predetermined connection access identifier 1192 from the authentication node 1194

Thus, in the example configuration employing NAT as the connection medium, A temporary NAT entry is stored in the NAT table when an eminent connection request is expected from a remote user device, and the dedicated NAT table remains null when no connection requests 1190 are expected, thus preventing rogue accesses or address sniffing attempts from stumbling on an available NAT entry, as disclosed at step 209. Therefore, the temporary rule 1168 is a (Network Address Translation) NAT rule for associating the remote device to the local host according to a routing protocol, TCP/IP in the example shown, as depicted at step 210.

Following entry of the temporary rule 1168 expecting the user 1170, the gateway node receives the connection request 1190 from the user, in which the connection request 1190 includes the port identifier 1192 for matching to the port number 1171 in the rule 1168, and emanates from the user device address 1172-1, as shown at step 211. In the example configuration, this includes receiving a TCP/IP connection request from the remote device 1170 using the connection access identifier 1192, as shown at step 212. The gateway node 1150 thus establishes a connection between the user device address 1172-1 and an address 1120-1 indicative of the compute session 1110-1, as shown at step 213.

Following successful establishment of the connection via NAT, the gateway node adds an entry 1164-1 to a firewall state table 1155, including a mapping 1154, to associate the remote device identifier with the local host identifier, in which the firewall state table 1155 is for identifying remote devices 1170 for communication with the local host 1110-1, as shown at step 214. The gateway node 1152 generates an entry 1164-1 in the firewall state table 115, in which the firewall state table controls access to the gateway node from the public access network 1130, and thus to the remote server 1111 providing the virtual computing services, as disclosed at step 215. The generated entry 1164 thus defines an allowed connection between the user device address and the address of the compute session 1110-1, because the firewall state table has a higher routing precedence than the address mapping table provided by conventional NAT and thus is referenced prior to NAT routing for message traffic. Since the firewall state table 1154 includes the needed routing information to communicate with the compute session 1110-1, no NAT lookup is required.

The firewall state table 1154 thus associates active sessions between remote devices for communication with the local host virtual compute sessions for providing selective authenticated secure access to the subnetwork 1140 including the compute session 1110-1, as depicted at step 216.

Once the firewall state table 1154 is populated, the gateway node 1150 removes, after establishing the requested connection, the original routing rule 1168 such that subsequent requests for connection to the host via the same connection access identifier are ignored, thus preventing a security breach via the connection enabling NAT rule, as shown at step 217. The gateway node 1150 then removes the established rule from the address mapping table, such that the removed rule preventing access via the user address and sent port number, the port number remaining available for successive connection requests, depicted at step 218, and maintains the generated entry for permitting successive communications between the user device address and the compute session 1110-1, thus continuing to provide virtual computing services to the user, as shown at step 219. The gateway 1150 continues routing subsequent communication between the remote device and the local host using the entry in the firewall state table and the established connection, as disclosed at step 220. Check are performed, at step 221, for additional connection requests, and requests from other users 1170-N result in replacing the removed rule with a subsequent rule, the subsequent rule for establishing a connection with a different local host indicative of another user session, as shown at step 222.

The following is a description of multi-tenant data center design from the provisional application. See also FIGS. 6-11.

Connecting thin clients to virtualized desktops over a network presents significant networking, security and performance challenges that the following addresses: A Multi-Tenant Data Center networking design that scales compute using dtElements and leverages MPLS to resolve the overlapping address space of multiple enterprise customers and connect multiple compute elements in a data center.

dtMTDC—Multi-Tenant Data Center

In order to integrate a hosted desktop with an enterprise— so that the hosted desktop can communicate with domain controllers, file servers, etc.—the hosted desktop must be addressable in a way that is consistent with the enterprise's network addressing plan. Simply put, the enterprise must be able to decide the addresses of desktops that they host with a service provider; the service provider cannot dictate the desktop addressing plan to the enterprise.

Additionally, in order to host the enterprise's desktops, the service provider must be able to communicate directly with agent software in the hosted desktop. In other words, not only can the service provider not dictate address space to the enterprise, the service provider must work within the enterprise's existing addressing plan.

Because of the Internet's limited address space, it is highly probably that large enterprises are using private address space (as defined in RFC 1918) for their internal addressing requirements. Further, it is highly probably that multiple, discrete enterprises are using the same private address ranges. (e.g., two enterprises may both address themselves using 192.168.0.0/16.)

In order for the service provider to provide hosted desktops at a competitive price, some amount of infrastructure must be shared between enterprise tenants. For example, a single router must be able to route IP traffic for hosted desktops in Enterprise A and Enterprise B. The conflict arises from the high probability of Enterprise A and Enterprise B using the same RFC 1918 address space. If each enterprise has a desktop with the IP address 192.168.11.47, traditional routers will be unable to resolve this conflict.

The carrier networking world has given us a solution to this problem in the form of MPLS. MPLS provides a suite of technologies—such as Virtual Routing and Forward (VRF)—that enable us to effectively virtualize the router. By creating virtual routers for each enterprise, we are able to maintain distinct routing tables for each tenant, and resolve the addressing conflict.

Desktone Multi-Tenant Data Center Requirements
  Secure
  Scalable
  Modular
  Fault-tolerant
Multi-Tenancy Challenges
  Multiple tenants will have multiple over-lapping address spaces.
  These customer address spaces may even collide with the service provider network!
  VLANs alone cannot solve this problem.
  Multiple Racks and VLANS are complicated
dtElement Overview
  Use industry standard technologies
  Integrate with existing enterprise authentication mechanisms (e.g. Active Directory, SecurID)
  Scale to hundreds of thousands of users
  User experience similar to local desktop
  Leverage open source technology where applicable and appropriate
  Provide remote support and maintenance capability
  Highly available infrastructure
  Multi-tenant capable
  Service Provider friendly (e.g. branding, integration with OSS and back-office systems)
dtElement Contents
Elements are the building blocks of a virtual desktop utility grid
  Each Element Contains:
  Virtualization Resources & Software
    Hypervisor
    Hypervisor Management API
  Compute Hardware
  Storage
  Network Hardware
  Desktone Management Software
  Provides horizontal scalability of virtual desktops
  Each Element operates independently of others
dtElement Design
  Scalability
  Built with large-scale, multi-tenant environments in mind
  Same Element design can also support SMB (e.g. dynamic sizing)
  Increase available virtual desktops by adding new Element instances
  Java EE Application Server
  EJBs (Stateless Session Beans)
  Web Services
  JMS
  JMX (MBeans)
  High availability
  Clustered application server instances
  Active/standby relational database
  High performance, highly reliable storage array
dtElement Logical Components
  Data Repository: Relational database; uses Hibernate for object relational mapping
  Element Manager
  Manages all Element components
  Exposes a web services API to serve requests from the Access Fabric (to be used in the future for service provider integration—e.g. billing data)
  Desktop Manager & Desktop Factory: Abstraction layer integrating with the virtual desktop hypervisor manager
  Collector: Manages the client agents and sends resource data to the Access Fabric
  Allocator: Allocates virtual desktop sessions based on "Best Fit"
  Provision Manager: Intelligently provisions resources to meet the desired optimization strategy.

Those skilled in the art should readily appreciate that the programs and methods for allocating and managing remote connections as defined herein are deliverable to a user processing and rendering device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for allocating and managing remote connections has been particularly shown and described with references to embodiments thereof, it will be understood by those skilled in the art that various changes in form and details may be made therein without departing from the scope of the invention encompassed by the appended claims.

What is claimed is:

1. A computer system for supporting multiple enterprises, comprising:
    a plurality of host machines, each host machine hosting a plurality of virtual desktops;
    a server provider computer network interconnecting the plurality of host machines;
    wherein each host machine is dynamically assigned to a single enterprise from among the multiple enterprises including a first host machine assigned to a first enterprise and a second host machine assigned to a second enterprise, and each virtual desktop in the plurality of virtual desktops hosted on the host machine is assigned a unique network address in a network address space of the single enterprise;
    a virtual local area network for each enterprise of the multiple enterprises, each virtual local area network for an enterprise incorporating computer resources on an enterprise computer network of the enterprise and the virtual desktops for the enterprise on one or more of the plurality of host machines, wherein the virtual desktops for the enterprise are configured to access the computer resources for the enterprise on the enterprise computer network through the enterprise's virtual local area network to which the virtual desktops are connected; and
    wherein the enterprise computer networks have overlapping network address spaces and wherein the virtual desktops on the first host machine assigned to the first enterprise and the virtual desktops on the second host machine assigned to the second enterprise can have network addresses in the overlapping network address spaces;
    a single router connected to the service provider computer network and the enterprise computer networks though a gateway node, wherein the single router comprises a plurality of virtual routers, each virtual router being associated with a corresponding enterprise of the multiple enterprises, wherein the virtual router for each enterprise includes a distinct routing table for the network address space of the enterprise, configured to route traffic between the virtual desktops hosted on the plurality of host machines and the computer resources on each of the enterprise computer networks;
    the gateway node connected to a public access network, the public access network allowing communication with user devices;
    wherein the gateway node, in response to requests from user devices for access to virtual desktops hosted on the host machines, is configured to establish, for each request associated with a user belonging to one of the enterprises, a connection between the user device making the request and one of the virtual desktops on one of the host machines assigned to the enterprise corresponding to the user associated with the request and wherein the gateway node establishes the connection using a temporary network address table (NAT) routing rule and, once the connection is established, generates an entry in a firewall state table that replaces the NAT routing rule, the firewall state table for controlling access to the gateway node, the generated entry defining an allowed connection between the user device address and the address of the virtual desktop.

2. The computer system of claim 1, wherein the router implements multiprotocol label switching.

3. The computer system of claim 2, wherein the distinct routing table for each enterprise includes a virtual private network routing and forwarding (VRF) table.

4. The computer system of claim 1, wherein the temporary NAT routing rule is only valid for a specified time period.

5. The computer system of claim 1, wherein the temporary NAT routing rule is removed after the specified time period.

6. The computer system of claim 1, wherein the temporary NAT routing rule temporarily associates the virtual desktop to a port, of a dynamic range of ports, specified by the rule, and wherein after establishing the connection, the port number is no longer associated with the connection and can be re-used to establish additional connections.

7. The computer system of claim 1, wherein the firewall state table takes routing precedent to the NAT routing rule such that once the connection is established the gateway node routes subsequent communication between the user device and the virtual desktop using the entry in the firewall state table until a session terminates.

8. A method of operation of a computer system to support multiple enterprises, the method comprising:
    providing, on each of a plurality of host machines connected to a service provider computer network, a plurality of virtual desktops;
    dynamically assigning each host machine to a single enterprise from among the multiple enterprises including a first host machine assigned to a first enterprise and a second host machine assigned to a second enterprise, and assigning, to each virtual desktop in the plurality of virtual desktops hosted on the host machine, a unique network address in a network address space of the single enterprise;
    providing a single router connected to the enterprise computer networks and the service provider computer network;
    establishing a virtual local area network for each enterprise of the multiple enterprises, each virtual local area network for an enterprise incorporating computer resources on an enterprise computer network of the enterprise and the virtual desktops assigned to the enterprise on one or more of the plurality of host machines, wherein the virtual desktops assigned to the enterprise are connected through the virtual local area network for the enterprise to access the computer resources for the enterprise on the enterprise computer network; and
    wherein the enterprise computer networks have overlapping network address spaces and wherein the virtual desktops on the first host machine assigned to the first enterprise and the virtual desktops the second host machine assigned to the second enterprise can have network addresses in the overlapping network address spaces;

establishing a virtual router on the router for each enterprise of the multiple enterprises, wherein the virtual router for each enterprise includes a distinct routing table in the router for the network address space of the enterprise, configured to route traffic between the virtual desktops hosted on the plurality of host machines and the computer resources on each of the enterprise computer networks;

wherein each host machine is dynamically assigned to only one virtual local area network for a single enterprise, such that the virtual desktops hosted on the host machine are assigned a network address in the network address space of that single enterprise;

providing a gateway node connected to a public access network, the public access network allowing communication with user devices, the gateway node, in response to requests from user devices for access to virtual desktops hosted on the host machines, establishing, for each request associated with a user belonging to one of the enterprises, a connection between the user device making the request and one of the virtual desktops on one of the host machines assigned to the enterprise corresponding to the user associated with the request and wherein the gateway node establishes the connection using a temporary network address table (NAT) routing rule and, once the connection is established, generates an entry in a firewall state table that replaces the NAT routing rule, the firewall state table for controlling access to the gateway node, the generated entry defining an allowed connection between the user device address and the address of the virtual desktop.

9. The method of claim 8, wherein the distinct routing table for each enterprise includes a virtual private network routing and forwarding (VRF) table.

10. The method of claim 8, wherein the router implements multiprotocol label switching.

11. The method of claim 8, wherein the temporary NAT routing rule is only valid for a specified time period.

12. The method of claim 8, wherein the temporary NAT routing rule is removed after the specified time period.

13. The method of claim 8, wherein the temporary NAT routing rule temporarily associates the virtual desktop to a port, of a dynamic range of ports, specified by the rule, and wherein after establishing the connection, the port number is no longer associated with the connection and can be re-used to establish additional connections.

14. The method of claim 8, wherein the firewall state table takes routing precedent to the NAT routing rule such that once the connection is established the gateway node routes subsequent communication between the user device and the virtual desktop using the entry in the firewall state table until a session terminates.

15. A computer program product comprising one or more computer storage devices having computer program instructions stored thereon that, when executed by one or more computers, configure a computer system to support multiple enterprises, the computer system comprising:

on each of a plurality of host machines connected to a service provider computer network, a plurality of virtual desktops;

wherein each host machine is dynamically assigned to a single enterprise from among the multiple enterprises including a first host machine assigned to a first enterprise and a second host machine assigned to a second enterprise, and each virtual desktop in the plurality of virtual desktops hosted on the host machine is assigned a unique network address in a network address space of the single enterprise;

a virtual local area network for each enterprise of the multiple enterprises, each virtual local area network for an enterprise incorporating computer resources on an enterprise computer network of the enterprise and the virtual desktops assigned to the enterprise on one or more of the plurality of host machines, wherein the virtual desktops assigned to the enterprise are connected through the virtual local area network for the enterprise to access the computer resources for the enterprise on the enterprise computer network; and wherein the enterprise computer networks have overlapping network address spaces and wherein the virtual desktops on the first host machine assigned to the first enterprise and the virtual desktops on the second host machine assigned to the second enterprise can have network addresses in the overlapping network address spaces;

a single router connected to the enterprise computer networks through a gateway node, wherein the single router comprises a plurality of virtual routers, each virtual router being associated with a corresponding enterprise of the multiple enterprises, wherein the virtual router for each enterprise includes a distinct routing table for the network address space for the enterprise, configured to route traffic between the virtual desktops hosted on the plurality of host machines and the computer resources on each of the enterprise computer networks;

the gateway node connected to a public access network, the public access network allowing communication with user devices;

wherein the gateway node, in response to requests from user devices for access to virtual desktops hosted on the host machines, is configured to establish, for each request associated with a user belonging to one of the enterprises, a connection between the user device making the request and one of the virtual desktops on one of the host machines assigned to the enterprise corresponding to the user associated with the request and wherein the gateway node establishes the connection using a temporary network address table (NAT) routing rule and, once the connection is established, generates an entry in a firewall state table that replaces the NAT routing rule, the firewall state table for controlling access to the gateway node, the generated entry defining an allowed connection between the user device address and the address of the virtual desktop.

16. The computer program product of claim 15, wherein the distinct routing table for each enterprise includes a virtual private network routing and forwarding (VRF) table.

17. The computer program product of claim 15, wherein the router implements multiprotocol label switching.

* * * * *